(12) United States Patent
Nada

(10) Patent No.: US 6,473,683 B2
(45) Date of Patent: Oct. 29, 2002

(54) VEHICLE SLIP CONTROL

(75) Inventor: Mitsuhiro Nada, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 10 days.

(21) Appl. No.: 09/816,084

(22) Filed: Mar. 26, 2001

(65) Prior Publication Data

US 2001/0032046 A1 Oct. 18, 2001

(30) Foreign Application Priority Data

Apr. 17, 2000 (JP) ........................................ 2000-115229

(51) Int. Cl.[7] ................................................ B60K 28/16
(52) U.S. Cl. .............................. 701/82; 701/90; 180/197
(58) Field of Search ............................. 701/82, 84, 90, 701/22; 180/197, 65.8

(56) References Cited

U.S. PATENT DOCUMENTS

| | | | | |
|---|---|---|---|---|
| 5,159,990 A | * | 11/1992 | Abe et al. | 180/197 |
| 5,428,539 A | * | 6/1995 | Kawamura et al. | 180/197 |
| 5,737,714 A | * | 4/1998 | Matsuno et al. | 180/197 |
| 6,182,002 B1 | * | 1/2001 | Bauerle et al. | 180/197 |

FOREIGN PATENT DOCUMENTS

| | | |
|---|---|---|
| JP | 63-038625 | 2/1988 |
| JP | 64-53437 | 3/1989 |
| JP | 4-095533 | 3/1992 |
| JP | 4-203331 | 7/1992 |
| JP | 5-001579 | 1/1993 |
| JP | 5-008666 | 1/1993 |
| JP | 5-231207 | 9/1993 |
| JP | 7-011988 | 1/1995 |
| JP | 7-096769 | 4/1995 |
| JP | 9-256884 | 9/1997 |
| JP | 9-273434 | 10/1997 |
| JP | 10-304514 | 11/1998 |
| JP | 11-173177 | 6/1999 |

* cited by examiner

*Primary Examiner*—Michael J. Zanelli
*Assistant Examiner*—Eric M Gibson
(74) *Attorney, Agent, or Firm*—Oliff & Berridge, PLC

(57) ABSTRACT

Torque restrictions on a drive shaft are enhanced when the angular acceleration AX of the drive shaft exceed a specific first threshold value. The enhanced torque restrictions are subsequently relaxed when the angular acceleration drops below the first threshold value and further a specific restriction relaxation condition is satisfied. The torque restrictions are expressed as a graph representing a relation according to which an upper torque limit Tmax decreases with increased angular acceleration AX. The torque restriction are enhanced or relaxed by moving the position of a torque axis relative to the graph along the angular acceleration axis while preserving a shape of the graph.

39 Claims, 16 Drawing Sheets

Torque Command Value/Vehicle Speed Map According to Accelerator opening AOP

Enhancement and Relaxation of Torque Restrictions According to Variations in Angular Motor Acceleration accelerator opening AOP motor rpm N motor torque torque restrictions enhanced
+10[rpm/16ms]

Engine Transfer to Idling Operation

Maximum Displacement $\delta$ max and Accelerator opening During Enhancement of Torque Restrictions

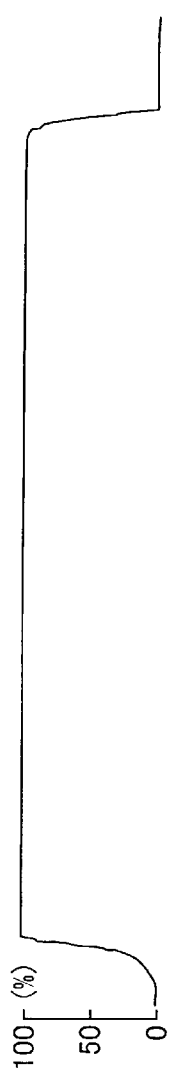
Fig. 16(a) accelerator opening AOP
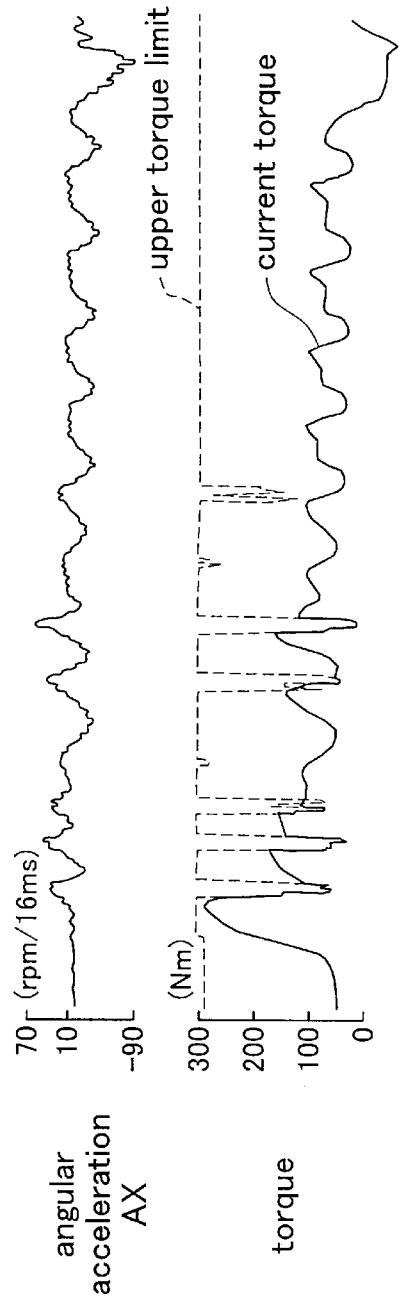
Fig. 16(b) angular acceleration AX
Fig. 16(c) torque
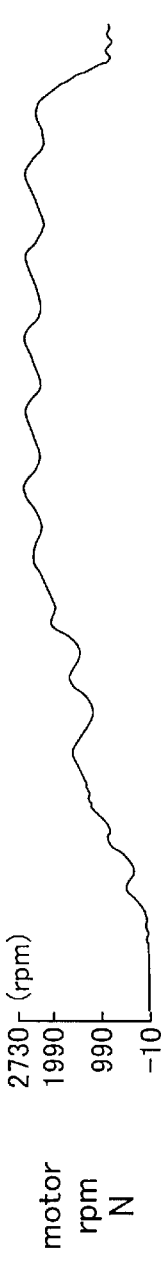
Fig. 16(d) motor rpm N
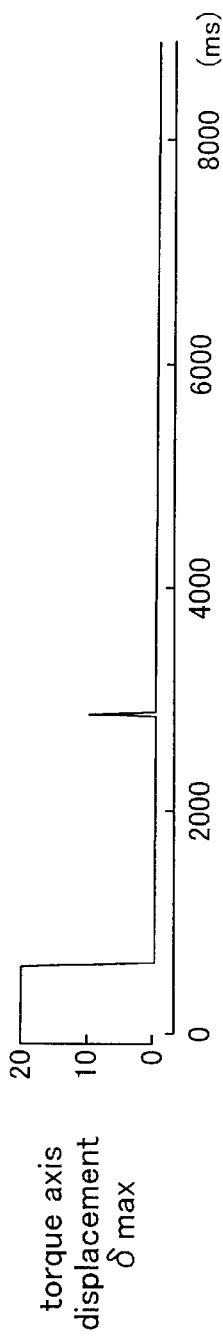
Fig. 16(e) torque axis displacement δ max

VEHICLE SLIP CONTROL

BACKGROUND OF THE INVENTION

1. Field of the Invention

The present invention relates to a technique for controlling the driving force of a vehicle with consideration for vehicle slip.

2. Description of the Related Art

Hybrid vehicles have been developed in which internal combustion engines and motors are provided as prime movers. A technique for controlling the slip of a hybrid vehicle is disclosed, for example, in JPA 10-304514. According to this technique, drive wheels become more likely to slip, prompting a reduction in motor torque, when the rate of change of the rotational angular speed (also referred to as "angular acceleration") of a drive shaft exceeds a threshold value. It is thus possible to prevent slip from occurring during an increase in the driving force of a motor.

The above-described slip control technique entails reducing the motor torque once the drive wheels have slipped, but the subsequent reduction in rotational angular speed allows the motor torque to be increased, occasionally leading to another slippage event. Slippage recurs in such cases. In particular, hybrid vehicles tend to be susceptible to this phenomenon because of the fast motor response to a varying torque. This shortcoming is not limited to hybrid vehicles and extends to other types of vehicles.

SUMMARY OF THE INVENTION

Accordingly, an object of the present invention is to reduce the likelihood that the torque control of a drive shaft will result in repeated slippage.

In order to attain at least part of the above and related objects of the present invention, there is provided a slip control device for use in a vehicle, which includes at least one prime mover for driving a drive shaft of the vehicle. The drive shaft transmits a driving force of the prime mover to the wheels of the vehicle. The slip control device comprises an angular acceleration meter configured to measure an angular acceleration of the drive shaft, and a torque controller. The torque controller enhances torque restrictions of the drive shaft when the angular acceleration exceeds a specific first threshold value, and relaxes the enhanced torque restrictions once the angular acceleration falls below the first threshold value and further satisfies a specific restriction relaxation condition According to the above structure, the likelihood of repeated slippage is reduced because the torque restrictions are relaxed only when the specific restriction relaxation condition is satisfied, but not merely when the angular acceleration of the drive shaft falls below the first threshold value.

In a preferred embodiment, the torque restrictions are expressed as a graph representing a relation between the angular acceleration and an upper torque limit of the drive shaft in a two dimensional space defined by an angular acceleration axis and a torque axis where the upper torque limit of the drive shaft decreases with increased angular acceleration. In this case, the torque restrictions are enhanced by moving a position of the torque axis relative to the graph along the angular acceleration axis while preserving a shape of the graph.

In another embodiment, the torque restrictions are enhanced and relaxed by varying a minimum value available for the angular acceleration in the graph. In still another embodiment, the torque restrictions are enhanced and relaxed by varying a maximum value available for the upper torque limit in the graph.

The present invention can be embodied in a variety of forms. Examples include vehicle slip control devices and methods, vehicles having such control devices, computer programs for executing the functions of such control devices and methods, recording media for storing such computer programs, and data signals embodied on a carrier wave including such computer programs.

These and other objects, features, aspects, and advantages of the present invention will become more apparent from the following detailed description of the preferred embodiments with the accompanying drawings.

BRIEF DESCRIPTION OF THE DRAWINGS

FIGS. 16(a)–16(e) show the manner in which parameters vary when the slip control procedures described with reference to first to fourth embodiments are performed.

DESCRIPTION OF THE PREFERRED EMBODIMENT

Embodiments of the present invention will now be described through embodiments according to the following sequence.

Figure 1:
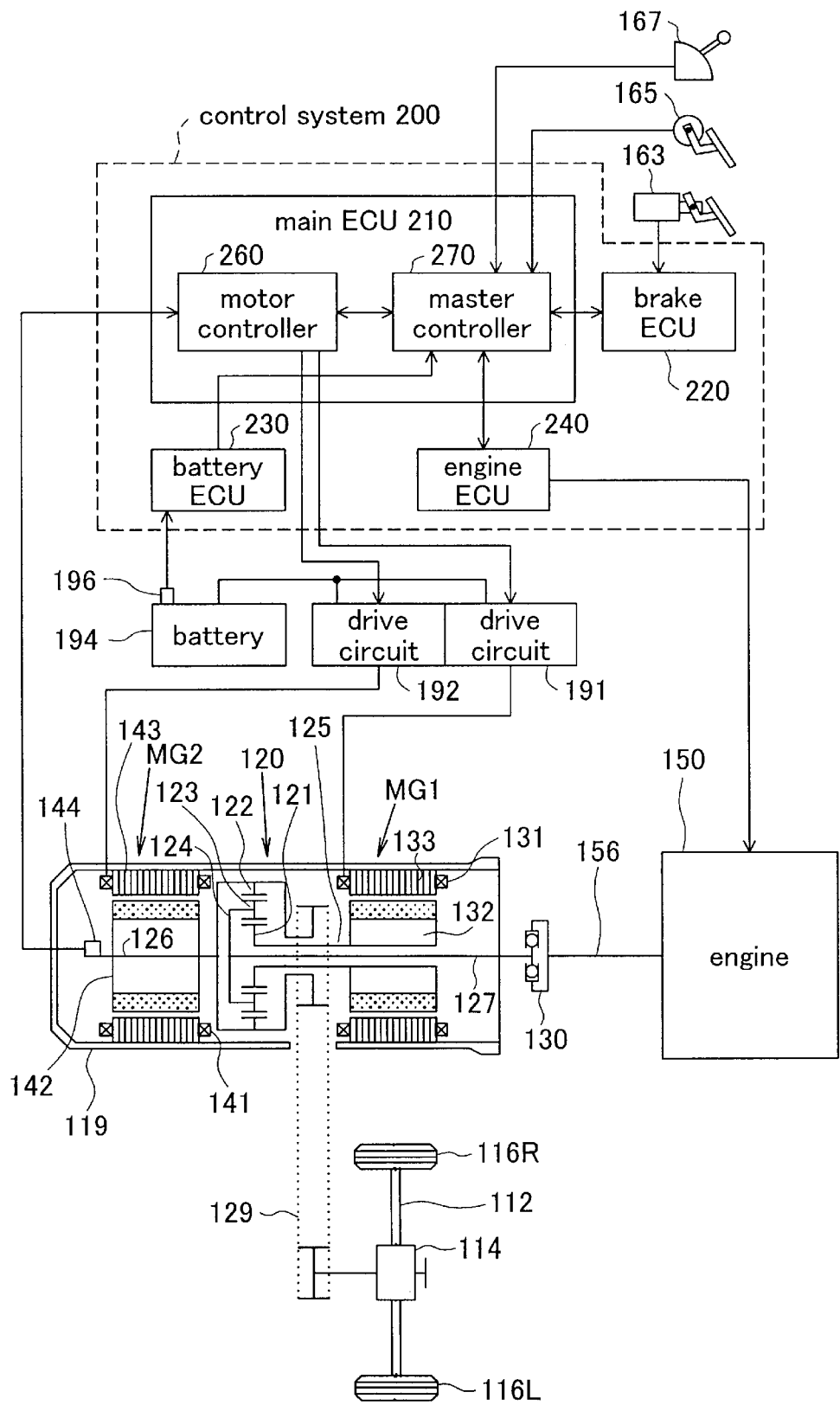
FIG. 1 is a diagram depicting the overall structure of a hybrid vehicle as a first embodiment of the present invention.

A. Overall Structure of Hybrid Vehicle
B. Basic Operation of Hybrid Vehicle
C. Structure of Control System
D. First Embodiment of Slip Control
E. Second Embodiment of Slip Control
F. Third Embodiment of Slip Control
G. Fourth Embodiment of Slip Control
H. Modifications A. Overall Structure of Hybrid Vehicle FIG. 1 is a diagram depicting the overall structure of a hybrid vehicle as a embodiment of the present invention. The hybrid vehicle comprises three prime movers: an engine 150 and two motor/generators MG1 and MG2. As used herein, the term "motor/generator" refers to a prime mover capable of functioning as a motor or a generator. For the sake of convenience, this will hereinafter be referred to merely as "a motor." The vehicle is controlled by a control system 200.

The control system 200 comprises a main ECU 210, a brake ECU 220, a battery ECU 230, and an engine ECU 240. Each ECU is configured as a unit in which a microcomputer, an input interface, an output interface, and a plurality of other circuit elements are mounted on a single circuit substrate. The main ECU 210 comprises a motor controller 260 and a master controller 270. The function of the master controller 270 is to set controlled variables such as the distribution of the outputs to be produced by the three prime movers 150, MG1, and MG2.

The engine 150 is a common gasoline engine that rotates a crankshaft 156. The operation of the engine 150 is controlled by the engine ECU 240. The engine ECU 240 controls the fuel injection of the engine 150 and other parameters in accordance with the commands from the master controller 270.

The motors MG1 and MG2, constructed as synchronous motors, comprise rotors 132 and 142 provided with a plurality of permanent magnets on the external peripheral surface, and stators 133 and 143 provided with three-phase coils 131 and 141 for generating rotating magnetic fields. The stators 133 and 143 are fixed in a casing 119. The three-phase coils 131 and 141 wound on the stators 133 and 143 of the motors MG1 and MG2 are connected to a secondary battery 194 via drive circuits 191 and 192, respectively. The drive circuits 191 and 192 are transistor inverters provided with a pair of transistors as the switching elements for each phase. The drive circuits 191 and 192 are controlled by a motor controller 260. Electric current flows between the battery 194 and the motors MG1 and MG2 when the transistors of the drive circuits 191 and 192 are switched on by a control signal from the motor controller 260. The motors MG1 and MG2 can receive power from the battery 194 to generate a driving force (this operating state will hereinafter be referred to as "power mode"), or they can function as power generators that generate an electromotive force across the three-phase coils 131 and 141 and charge the battery 194 when the rotors 132 and 142 are rotated by an outside force (this operating state will hereinafter be referred to as "regeneration mode").

The shafts of the engine 150 and motors MG1 and MG2 are mechanically connected via a planetary gear 120. The planetary gear 120 comprises a sun gear 121, a ring gear 122, and a planetary carrier 124 having a planetary pinion gear 123. In the hybrid vehicle of the present embodiment, the crankshaft 156 of the engine 150 is linked to a planetary carrier shaft 127 by a damper 130. The damper 130 is provided for the purpose of absorbing the torsional vibrations generated by the crankshaft 156. The rotor 132 of the motor MG1 is linked to a sun gear shaft 125. The rotor 142 of the motor MG2 is linked to a ring gear shaft 126. Rotation of the ring gear 122 is transmitted to an axle 112 and wheels 116R and 116L via a chain belt 129 and a differential gear 114.

The control system 200 contains various sensors for controlling the entire system, such as an acceleration sensor 165 for sensing the distance traveled by the acceleration pedal depressed by the driver, a shift position sensor 167 for sensing the position of the shift lever, a brake sensor 163 for sensing the pressure with which the brake pedal is depressed, a battery sensor 196 for sensing the charge state of the battery 194, and an rpm sensor 144 for measuring the rpm of the motor MG2. Because the ring gear shaft 126 and the axle 112 are mechanically linked by the chain belt 129, the ring gear shaft 126 and axle 112 have a constant rpm ratio. Consequently, the rpm sensor 144 provided to the ring gear shaft 126 senses not only the rpm of the motor MG2 but also the rpm of the axle 112.

B. Basic Operation of Hybrid Vehicle

The operation of the planetary gear 120 will first be described as part of a description concerning the basic operation of a hybrid vehicle. The planetary gear 120 has a property whereby setting the rpm values of two out of the three shafts described above will determine the rpm of the remaining shaft. The relation between the rpm values of these shafts is defined by Eq. (1) below.

$$Nc = Ns \times \rho/(1+\rho) + Nr \times 1/(1+\rho) \tag{1}$$

where Nc is the rpm of the planetary carrier shaft 127, Ns the rpm of the sun gear shaft 125, and Nr the rpm of the ring gear shaft 126. In addition, $\rho$ is the gear ratio of the sun gear 121 and ring gear 122, as expressed by the following equation.

$$\rho = \text{(Number of teeth of sun gear 121)/(Number of teeth of ring gear 122)}$$

In addition, the torques of the three shafts are independent of the rpm and conform to the constant relations given by Eqs. (2) and (3) below.

$$Ts = Tc \times \rho/(1+\rho) \tag{2}$$

$$Tr = Tc \times 1/(1+\rho) = Ts/\rho \tag{3}$$

where Tc is the torque of the planetary carrier shaft 127, Ts the torque of the sun gear shaft 125, and Tr the torque of the ring gear shaft 126.

Because the planetary gear 120 has such functions, the hybrid vehicle of the present embodiment can travel in a variety of modes. When, for example, the hybrid vehicle is in a comparatively low-speed mode after starting to move, driving force is transmitted to the axle 112 and the vehicle is propelled by the supply of power to the motor MG2 while the engine 150 is stopped. Similarly, the vehicle may sometimes be propelled while the engine 150 is idling.

When the hybrid vehicle has reached a prescribed speed following startup, the control system 200 powers the motor MG1, and the engine 150 is started by the outputted torque. In the process, the reaction torque of the motor MG1 is also outputted to the ring gear 122 via the planetary gear 120.

When the engine 150 is operated and the planetary carrier shaft 127 rotated, the sun gear shaft 125 and ring gear shaft 126 are rotated under conditions that satisfy Eqs. (1) to (3) above. The driving force resulting from the rotation of the ring gear shaft 126 is directly transmitted to the wheels 116R and 116L. The driving force resulting from the rotation of the sun gear shaft 125 can be regenerated as electric power by the first motor MG1. Powering the second motor MG2 allows the driving force to be outputted to the wheels 116R and 116L via the ring gear shaft 126.

During steady-state operation, the output of the engine 150 is set to a value substantially equal to the required driving force of the axle 112 (namely, Torque×Rpm of axle 112). In the process, part of the output of the engine 150 is transmitted directly to the axle 112 via the ring gear shaft 126, and the remainder of the output is regenerated as electric power by the first motor MG1. The electric power thus regenerated is used to allow the second motor MG2 to generate a torque for rotating the ring gear shaft 126. As a result, the axle 112 can be driven by the desired torque at the desired rpm.

If the torque transmitted to the axle 112 is insufficient, this torque is assisted by the second motor MG2. The electric power regenerated by the first motor MG1 and the electric power stored in the battery 194 are used as the assisting electric power. Thus, the control system 200 controls the operation of the two motors MG1 and MG2 in accordance with the required driving force to be outputted to the axle 112.

The hybrid vehicle of the present embodiment can also move backward while the engine 150 is operated. When the engine 150 is operated, the planetary carrier shaft 127 rotates in the same direction as during the forward movement. At this time, the ring gear shaft 126 reverses to the backward direction if the first motor MG1 is controlled such that the sun gear shaft 125 is rotated at a higher rpm than the rpm of the planetary carrier shaft 127, as can be seen from Eq. (1) above. The control system 200 can propel the hybrid vehicle backward by controlling the torque output of the second motor MG2 while rotating it backward.

The planetary gear 120 can rotate the planetary carrier 124 and sun gear 121 while the ring gear 122 remains stationary. Consequently, the engine 150 can be operated even when the vehicle does not move. When, for example, the remaining capacity of the battery 194 is low, the battery 194 can be charged by operating the engine 150 and letting the first motor MG1 to operate in a regenerating mode. When the vehicle is stationary, the engine 150 can be started by the torque of the first motor MG1 by allowing the motor to operate in the power mode.

C. Structure of Control System

Figure 2:
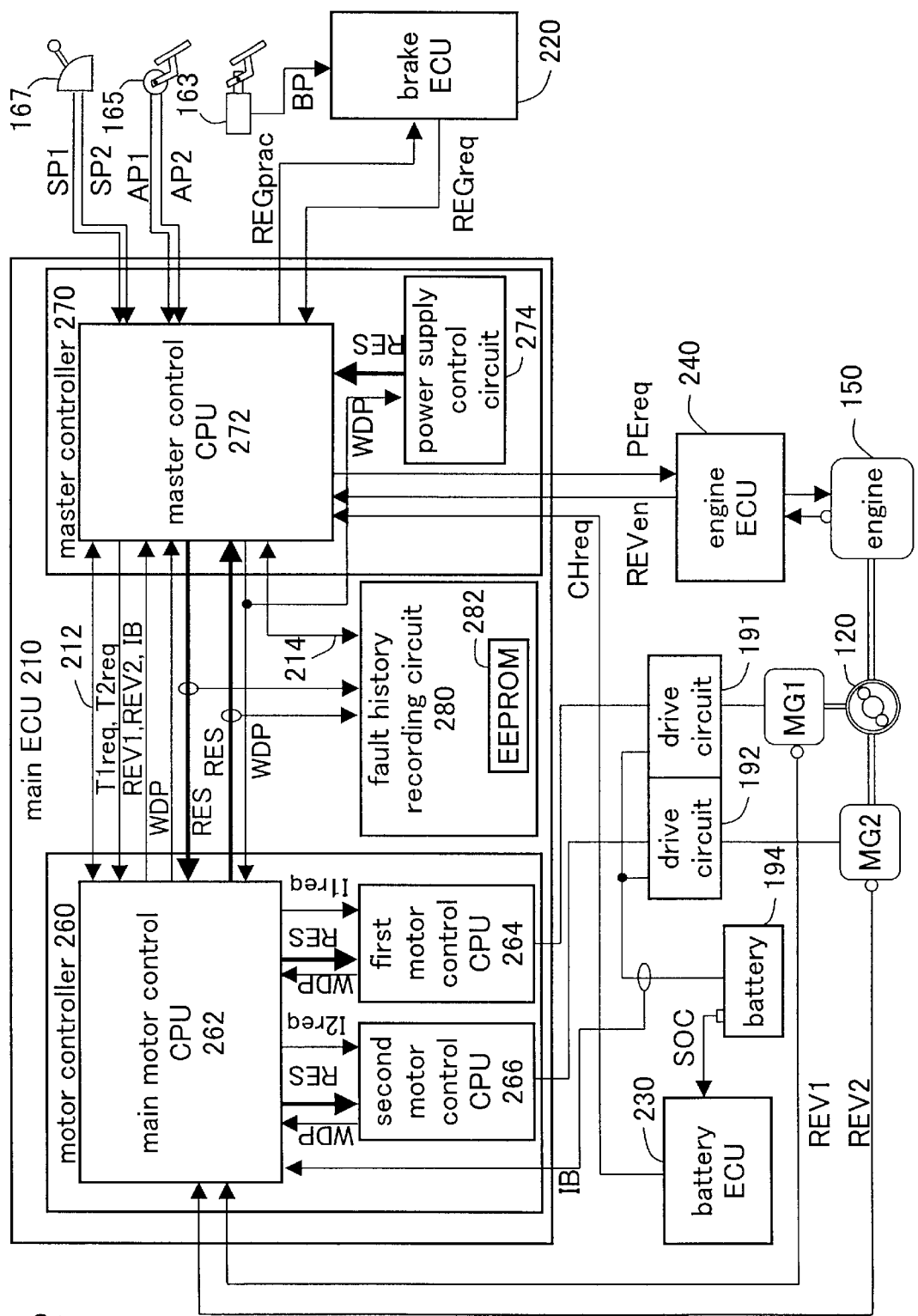
FIG. 2 is a block diagram depicting a more detailed structure of the control system 200.

FIG. 2 is a block diagram depicting a more detailed structure of the control system 200. The master controller 270 comprises a master control CPU 272 and a power supply control circuit 274. The motor controller 260 comprises a main motor control CPU 262 and two motor control CPUs 264 and 266 for controlling the motors MG1 and MG2, respectively. Each CPU is a single-chip microcomputer including a CPU (not shown), a ROM, a RAM, an input port, and an output port.

The function of the master control CPU 272 is to determine the rpm values, torque distribution, and other controlled variables of the three prime movers 150, MG1, and MG2; to feed the required values to other CPUs or ECUs; and to control the drive of each prime mover. To be allowed to perform such control, the master control CPU 272 is furnished with accelerator position signals AP1 and AP2 for indicating the accelerator opening, shift position signals SP2 and SP2 for indicating shift position. The term "accelerator opening" means a level of the accelerator position signal, or "accelerator position level", in this specification. The accelerator opening ranges from 0% (full closure) to 100% (full opening). The acceleration sensor 165 and shift position sensor 167 each have a redundant configuration and each provide the master control CPU 272 with two accelerator position signals AP1 and AP2 and two shift position signals SP2 and SP2.

The power supply control circuit 274 converts a high DC voltage of the battery 194 to a low DC voltage for the circuits inside the main ECU 210. The power supply control circuit 274 functions as a monitoring circuit that monitors the master control CPU 272 for faults.

The engine ECU 240 controls the engine 150 in accordance with the required engine output value PEreq, which is received from the master control CPU 272. The rpm REVen of the engine 150 is fed back to the master control CPU 272 from the engine ECU 240.

The main motor control CPU 262 feeds required current values I1req and I2req to the two respective motor control CPUs 264 and 266 in accordance with the required torque values T1req and T2req pertaining to the motors MG1 and MG2 and arriving from the master control CPU 272. The motor control CPUs 264 and 266 control their respective drive circuits 191 and 192 in accordance with the required current values I1req and I2req to drive the motors MG1 and MG2. The rpm values REV1 and REV2 of the motors MG1 and MG2 are fed back to the main motor control CPU 262 from the rpm sensors of the motors MG1 and MG2. The rpm values REV1 and REV2 of the motors MG1 and MG2, the electric current value IB of the battery 194 for the drive circuits 191 and 192 are fed back to the master control CPU 272 from the main motor control CPU 262.

The battery ECU 230 monitors the charging conditions SOC (State Of Cell) of the battery 194 and sends the required charging value CHreq of the battery 194 to the master control CPU 272 as needed. The master control CPU 272 takes this required value CHreq into account and determines the output of each prime mover. When charging is required, a driving force greater than the output needed for propulsion is outputted by the engine 150, and a portion thereof is distributed to allow the first motor MG1 to perform a charging operation.

The brake ECU 220 performs a control routine aimed at achieving a balance between a hydraulic brake (not shown) and a regeneration brake based on the second motor MG2. This is because this hybrid vehicle is constructed such that the second motor MG2 performs a regeneration operation during braking to charge the battery 194. Specifically, the brake ECU 220 inputs a regeneration request value REGreq to the master control CPU 272 on the basis of the brake pressure BP from the brake sensor 163. The master control CPU 272 determines the type of operation for the motors MG1 and MG2 on the basis of the request value REGreq and feeds back a practical regeneration value REGprac to the brake ECU 220. The brake ECU 220 sets the braking exerted by the hydraulic brake to an appropriate level on the basis of the brake pressure BP and the difference between the practical regeneration value REGprac and the regeneration request value REGreq.

Thus, the master control CPU 272 determines the outputs of the prime movers 150, MG1, and MG2 and sends the required values to the ECU 240 or the CPU 264 or 266 for controlling these movers. The ECU 240 or the CPU 264 or 266 controls each prime mover according to the required values. As a result, the hybrid vehicle can travel while proper driving force is outputted from the axle 112 in accordance with the running condition. During braking, the brake ECU 220 and the master control CPU 272 cooperate with each other in controlling the operation of the prime movers or hydraulic brake. This allows braking to be performed and electric power regenerated without creating any discomfort for the driver.

The four CPUs 272, 262, 264, and 266 have a function whereby mutual faults are monitored by means of so-called watchdog pulses WDP, and when a CPU develops a fault and the watchdog pulses stop, a reset signal RES is fed back to the CPU, which is thus reset. The master control CPU 272 is monitored for faults by the power supply control circuit 274.

A fault history recording circuit 280 is also provided. This circuit has an EEPROM 282 for recording fault generation history. The fault generation history of the acceleration sensor 165 or shift position sensor 167 is recorded in the EEPROM 282. The reset signals RES1 and RES2 transmitted between the master control CPU 272 and the main motor control CPU 262 are inputted to the input port of the fault history recording circuit 280. When generated by the fault history recording circuit 280, these reset signals RES1 and RES2 are stored in the internal EEPROM 282.

The master control CPU 272 and fault history recording circuit 280 can exchange various requests and notifications via a two-way communication line 214. A two-way communication line 212 is also provided between the master control CPU 272 and the main motor control CPU 262.

D. First Embodiment of Slip Control

Figure 3:
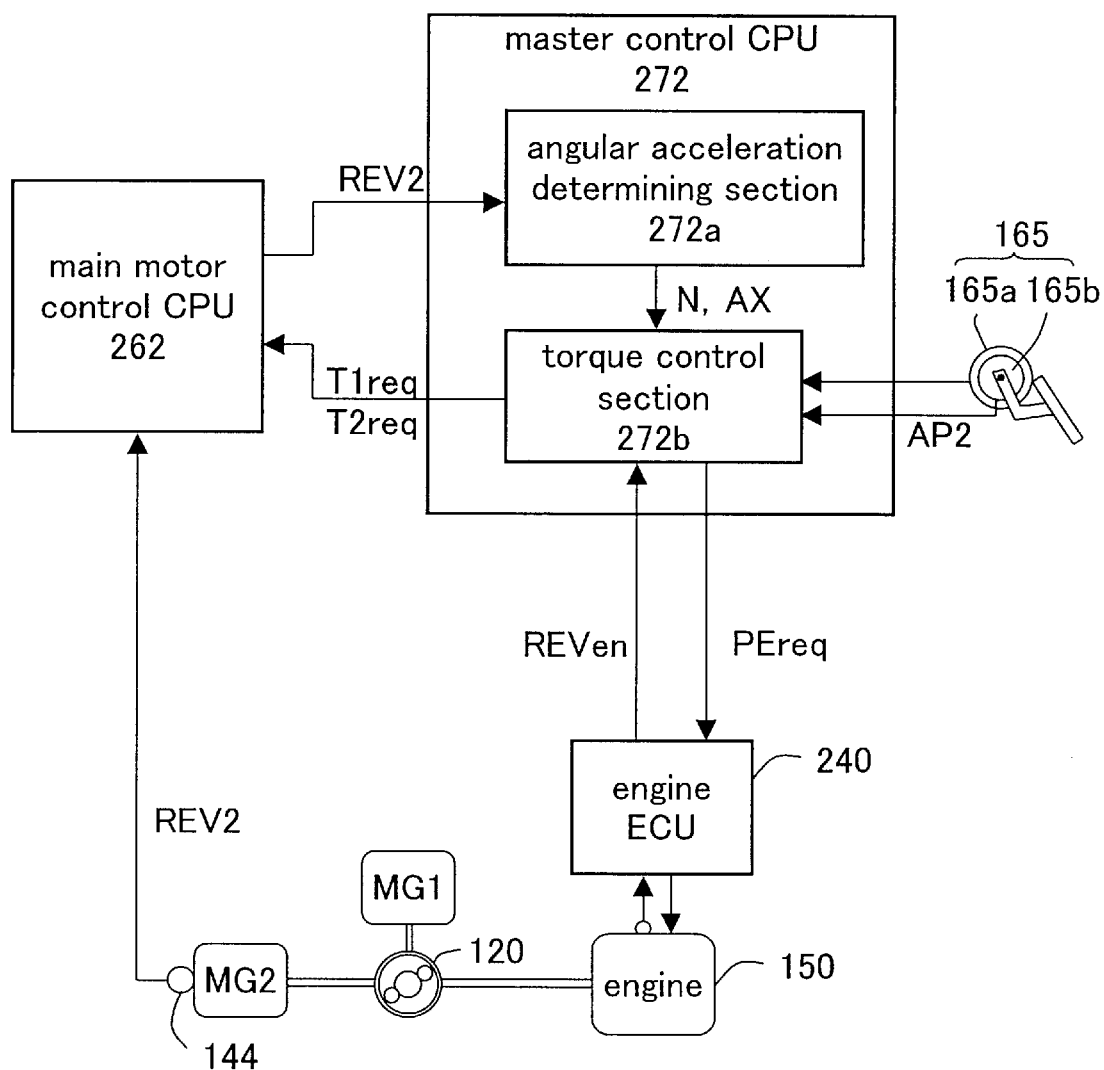
FIG. 3 is a block diagram depicting a circuit structure related to slip control.

FIG. 3 is a block diagram depicting a circuit structure related to slip control. The master control CPU 272 implements the functions of an angular acceleration determining section 272a and a torque control section 272b. The angular acceleration determining section 272a determines a rotational speed N and an angular acceleration AX (change of rotational speed with respect to time) of the second motor MG2 on the basis of the signal REV2 fed from the rpm sensor 144 via the main motor control CPU 262. The number of rotations per minute (rpm) may, for example, be used herein as the unit of measurement for the rotational speed N. The rpm sensor 144 may, for example, measure the rotational speed N every 16 milliseconds. The angular acceleration determining section 272a calculates the average value Nave (that is, the moving average) of three immediately preceding rotational speeds N. The angular acceleration AX can be determined as a change in the average value Nave, as shown by Eq. (4) below.

$$AX(i)=Nave(i)-Nave(i-1) \quad (4),$$

where AX(i) is the angular acceleration at time (i), and Nave(i) is the average value of rotational speeds N at times (i−2), (i−1), and (i).

In this case, the angular acceleration AX is measured in [rpm/16 ms] because it expresses the change in rpm every 16 ms. It should be noted, however, that any unit expressing the manner in which the rpm value changes over time can be used for the angular acceleration AX. In the present specification, "rpm," "rotational speed," and "angular acceleration" are synonyms. "Rotational acceleration" and "angular acceleration" are also synonyms.

The torque control section 272b determines the torque command values T1req and T2req of the two motors MG1 and MG2 and the required engine output value PEreq of the engine 150 on the basis of the accelerator position signals AP1 and AP2 supplied from the acceleration sensor 165, the rotational speed N and angular acceleration AX supplied from the angular acceleration determining section 272a, and the rpm REVen of the engine 150 supplied from the engine ECU 240.

The acceleration sensor 165 includes two sensors 165a and 165b. These sensors 165a and 165b may, for example, be potentiometers. The function of the torque control section 272b is to determine the accelerator opening (distance traveled by the depressed acceleration pedal) on the basis of the accelerator position signals AP1 and AP2 provided by the two sensors 165a and 165b.

Figure 4:
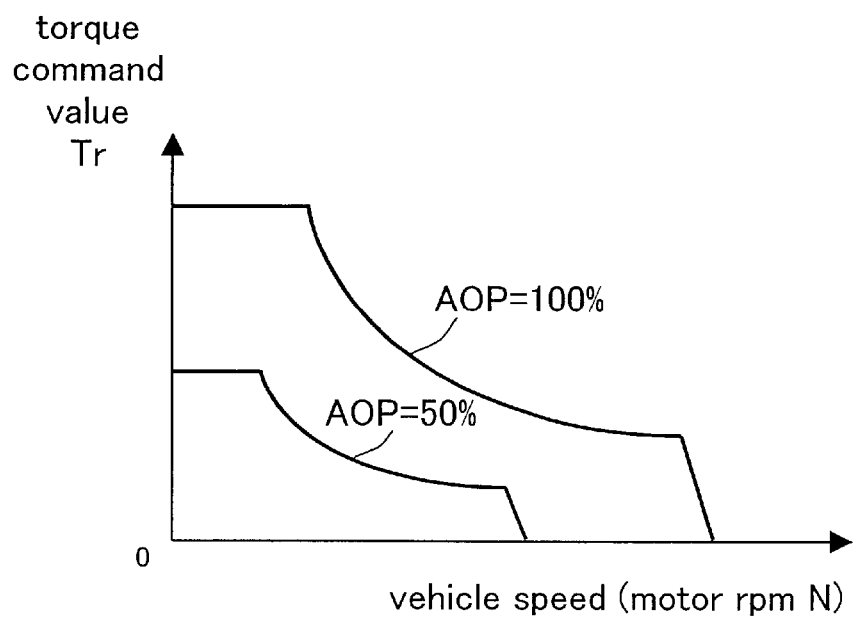
FIG. 4 is a diagram illustrating a a torque command value/vehicle speed map in accordance with an accelerator opening AOP.

FIG. 4 is a diagram illustrating a torque command value/vehicle speed map established in accordance with an accelerator opening AOP. As can be seen in the example, a map expressing the relation between vehicle speed and torque command value Tr (required torque value to be outputted to the axle) is prepared in advance for each accelerator opening value AOP. These maps may, for example, be stored in a ROM (not shown) of the master control CPU 272. In the present embodiment, the rpm N of the second motor MG2 is used instead of vehicle speed. The torque control section 272b determines the torque command value Tr from the corresponding map and establishes the torque distribution and rpm of the three prime movers 150, MG1, and MG2 in accordance with the torque command value Tr and the rpm N of the second motor MG2. The torque of the second motor MG2 is limited in accordance with the angular acceleration AX for slip control purposes, as will be described below.

The master control CPU 272 implements the functions of the angular acceleration determining section 272a and torque control section 272b by executing a computer program stored in a ROM (not shown).

The output shaft of the second motor MG2 corresponds to the drive shaft referred to in the claimed invention, and the rpm sensor 144 and angular acceleration determining section 272a correspond to the angular acceleration meter referred to in the claimed invention.

Figure 5:
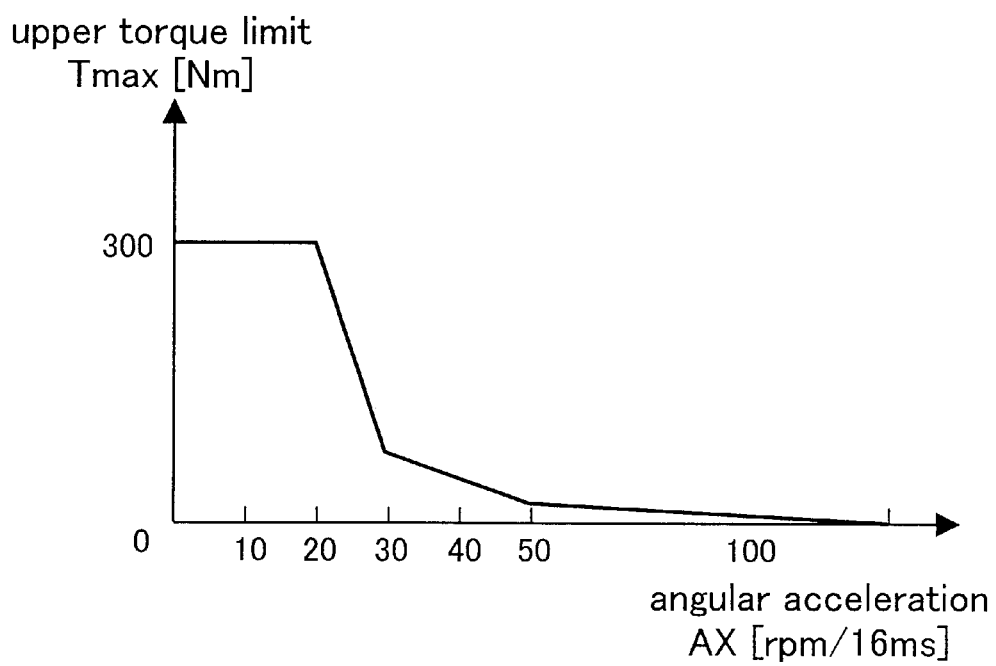
FIG. 5 is a graph depicting the torque restriction map of the second motor MG2 during normal operation.

FIG. 5 is a graph depicting the torque restriction map of the second motor MG2 during normal operation. As can be seen in the graph, the maximum torque limit Tmax of the second motor MG2 is set such that the value thereof decreases with increased angular acceleration AX. This is done to prevent the rpm N from rapidly increasing as a result of the fact that the motor torque is limited to a low value when the angular acceleration AX is high (that is, when the rpm N increases at a rapid pace). Slippage can be stopped by limiting the rapid increase of rpm N.

Figure 6:
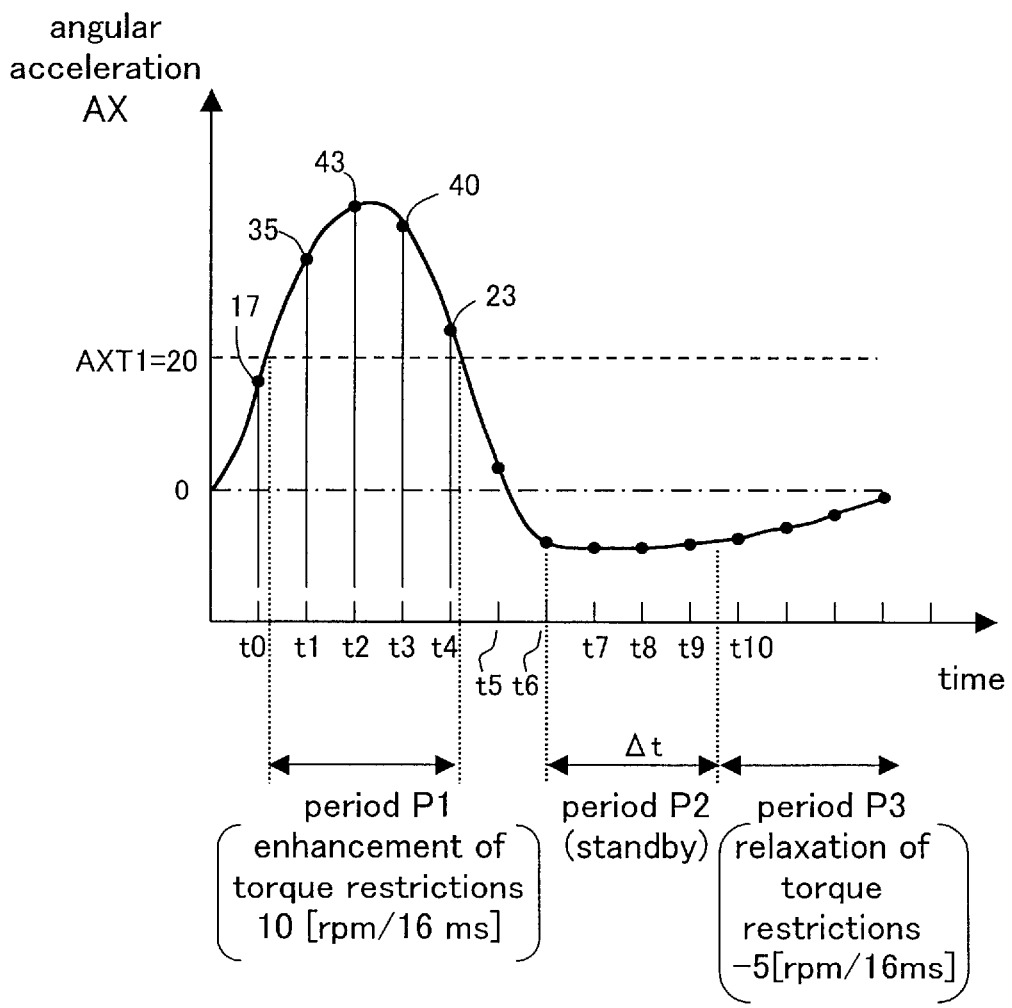
FIG. 6 is a diagram illustrating an example in which torque restrictions are enhanced or relaxed in accordance with variations in the angular acceleration of the motor.

FIG. 6 is a graph illustrating an example in which torque restrictions are adjusted in accordance with variations in the angular acceleration AX of the motor in the first embodiment of slip control. The angular acceleration AX is measured at times t0, t1, t2, . . . with constant periodicity (for example, 16 ms). In the first embodiment, slip is detected using the following slip sensing condition S1.

(S1): The angular acceleration AX is equal to or greater than a first threshold value AXT1.

Torque restrictions are enhanced during period P1 in FIG. 6, during which the angular acceleration AX is above a specific first threshold value AXT1. Specifically, torque restrictions are enhanced by the gradual movement of the axis for the upper torque limit Tmax in FIG. 5 to the right when the angular acceleration determining section 272a has detected that the angular acceleration AX exceeds the threshold value AXT1 at times t1–t4.

FIGS. 7(A) to 7(E) are diagrams illustrating the manner in which torque restrictions are enhanced during period P1 in FIG. 6. At time t0 in FIG. 6, the current angular acceleration AXc is 17 [rpm/16 ms], and is thus less than the first threshold value AXT1 (20 [rpm/16 ms]), so the torque restriction map is kept at an ordinary state (FIG. 7(A)). The term "current angular acceleration AXc" refers to the angular acceleration measured at this moment.

Figure 7A:
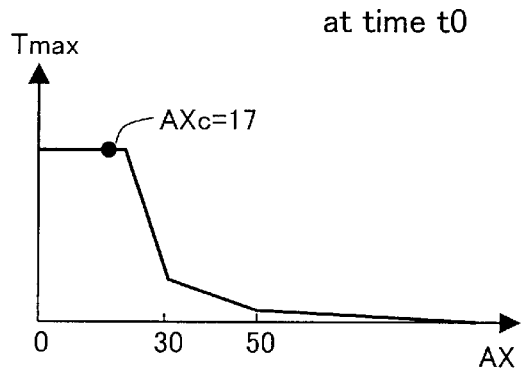
FIGS. 7(A)–7(E) show the manner in which torque restriction are enhanced during period P1 in FIG. 6.
Figure 7D:
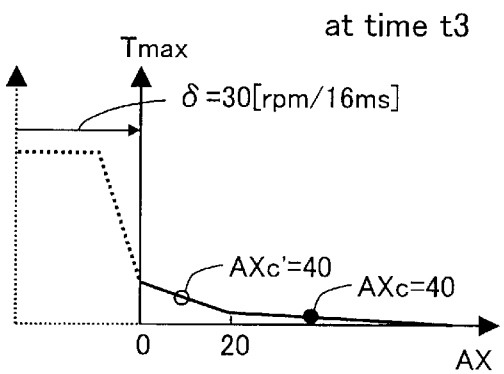
Figure 7B:
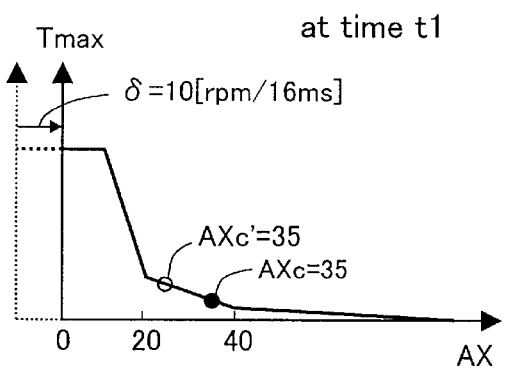

At time t1, the current angular acceleration AXc is greater than the threshold value AXT1, so the axis for the upper torque limit Tmax (hereinafter abbreviated as "the torque axis") is moved a given distance to the right from the initial state (FIG. 7(B)). In this example, the displacement is 10 [rpm/16 ms]. The black circle indicates the position of the current angular acceleration AXc on the torque restriction map resulting from the movement of the torque axis, and the white circle indicates the position of the current angular acceleration AXc' on the original torque restriction map. As can be seen in the drawings, the value of the upper torque limit Tmax for the current angular acceleration AXc on the post-enhancement torque restriction map is set lower than that on the initial torque restriction map.

Times t2, t3, and t4 in FIG. 6 are similar in that the current angular acceleration AXc is greater than the threshold value AXT1, so the torque axis is sequentially moved to the right each time. Specifically, the torque axis is moved by 10 [rpm/16 ms] every 16 ms (FIGS. 7(C) to 7(E)). At time t4, the displacement of the torque axis from the initial state is limited to a maximum displacement δmax (35 [rpm/16 ms]). The reason that the maximum displacement of the torque axis is limited in this manner is that an excessive displacement of the torque axis reduces the upper torque limit very close to zero irrespective of the value of angular acceleration AX, making it impossible for the second motor MG2 to drive the vehicle.

Figure 7E:
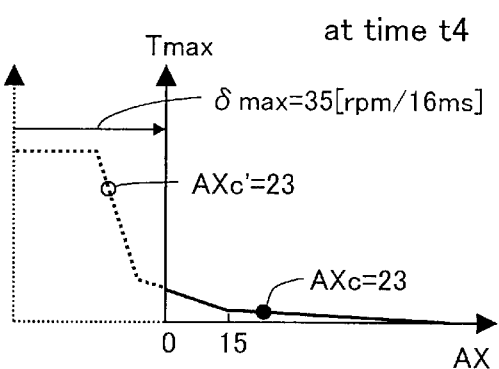
Figure 7C:
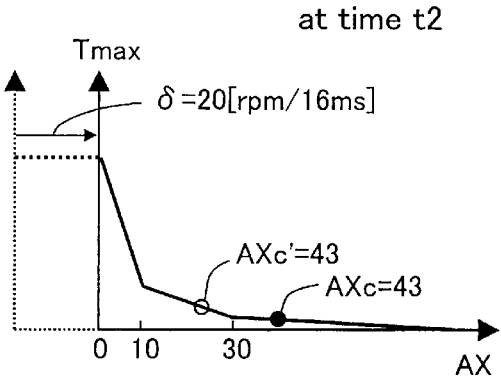

If the angular acceleration AX remains above the threshold value AXT1 for a long time, the upper torque limit Tmax is limited to a much lower value than when the initial torque restriction map is used, as can be seen in FIG. 7(E). As a result, it is possible to prevent the rpm N of the second motor MG2 (that is, the rpm of the axle 112) from abruptly rising to a higher level. When, for example, a wheel slips and the axle 112 suddenly starts to rotate at a much higher rpm, the rpm N of the second motor MG2 also increases in a proportional manner. Slippage is prevented in this case because the torque of the second motor MG2 is limited, as shown in FIGS. 7(A) to 7(E).

After torque restrictions have been enhanced in this manner at times t1–t4 in FIG. 6, the angular acceleration AX falls below the threshold value AXT1 at time t5, so the torque restriction map is kept in the state corresponding to time t4. The torque restrictions are relaxed when the angular acceleration AX is less than the threshold value AXT1 and one of the restriction relaxation conditions (M1a) to (M1c) described below is satisfied.

(M1a): The difference in speed between front and rear wheels is substantially zero while the accelerator opening is more than zero.

(M1b): The angular acceleration AX is zero or less.

(M1c): Vehicle speed is 30 km/h or greater.

The first condition M1a is satisfied when slippage is stopped and the driver intends to accelerate. In this case, therefore, torque restrictions on the second motor MG2 are relaxed. The vehicle speed may, for example, be measured by vehicle speed sensors (not shown) installed on the front and rear wheels.

The second condition M1b is satisfied when the rpm N remains steady or decreases. In such cases, torque restrictions are relaxed because there is usually no slippage.

The third condition M1c is satisfied when, for example, the slippage stops after occurring at the start of movement, and the vehicle speed gradually increases. Torque restrictions are relaxed in such cases because the probability of repeat slippage is usually low.

If any one of the three conditions M1a to M1c are satisfied at least for a specific period Δt, it is concluded that there is no slippage, and the torque restrictions are relaxed thereafter. When, for example, the angular acceleration AX remains negative during a standby period P2 (duration Δt=about 200 ms) following time t6 in FIG. 6, the torque restrictions are relaxed following a subsequent time t10. The standby period P2 is provided in order to achieve higher efficiency in preventing torque restrictions from being repeatedly enhanced and relaxed during variations in the angular acceleration or vehicle speed. It should be noted, however, that the standby period P2 is inessential and can be dispensed with.

The torque restrictions are relaxed by gradually moving the torque axis to the left each time. The resulting displacement is preferably less than the displacement during the enhancement of torque restrictions and can, for example, be set to 5 [rpm/16 ms]. This is because the torque restrictions is preferably relaxed gradually to prevent slip recurrence.

Figure 8A:
FIGS. 8(a)–8(c) are graphs depicting parameter variations observed in the absence of enhanced torque restrictions.
Figure 8B:
Figure 8C:
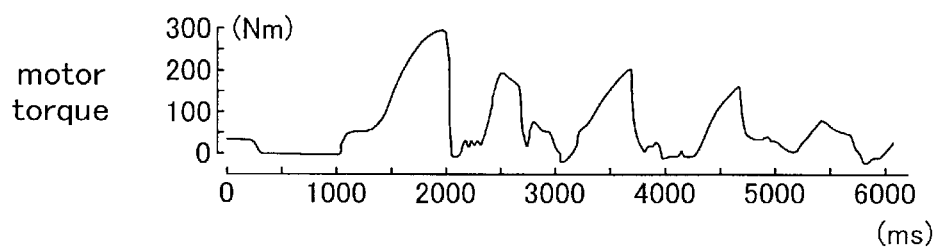

FIGS. 8(a)–8(c) show parameter variations observed in the absence of the enhanced torque restrictions described above. When the driver steps hard on the acceleration pedal in the manner shown in FIG. 8(a), the torque of the second motor MG2 increases abruptly (FIG. 8(c)), slippage occurs, and the second motor MG2 rapidly reaches a higher rpm N (FIG. 8(b)). This is accompanied by a rapid increase in the angular acceleration AX (not shown) of the second motor MG2, so the torque command value of the second motor MG2 is restricted in accordance with the torque restriction map in FIG. 5, and the motor torque rapidly decreases (FIG. 8(c)). As a result, slippage is temporarily stopped, and the rpm N decreases. However, the reduction in rpm N results in a lower angular acceleration AX, allowing the motor torque to increase in accordance with the torque restriction map in FIG. 5. The increase in motor torque allows slippage to recur and the motor rpm N to increase. Thus, using only the torque restriction map in FIG. 5 sometimes results in repeated slippage.

Figure 9A:
FIGS. 9(a)–9(c) are graphs depicting parameter variations observed when torque restrictions are enhanced in accordance with the first embodiment.
Figure 9B:
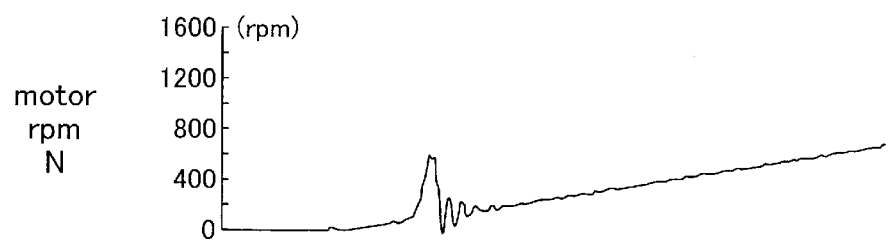
Figure 9C:
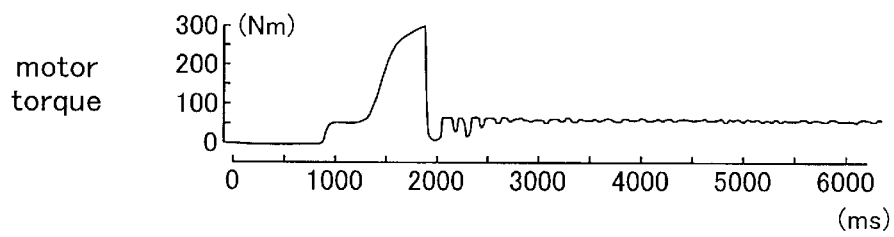
Figure 10A:
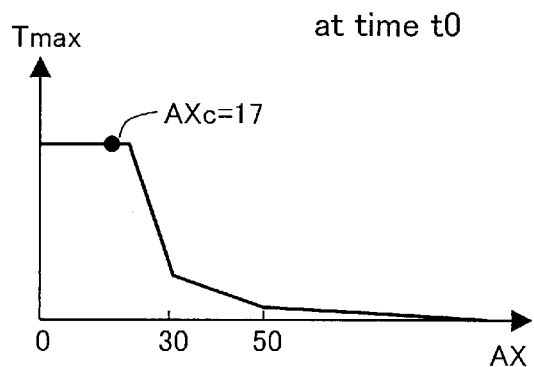
FIGS. 10(A)–10(E) show a first modification of the procedure for enhancing torque restrictions in accordance with the first embodiment.
Figure 10D:
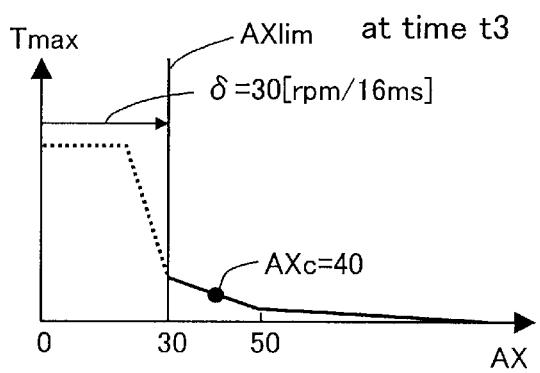
Figure 10B:
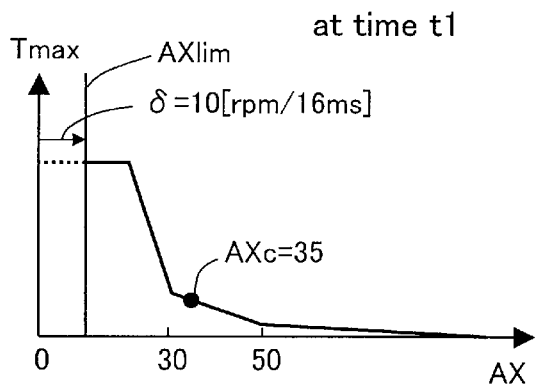
Figure 10E:
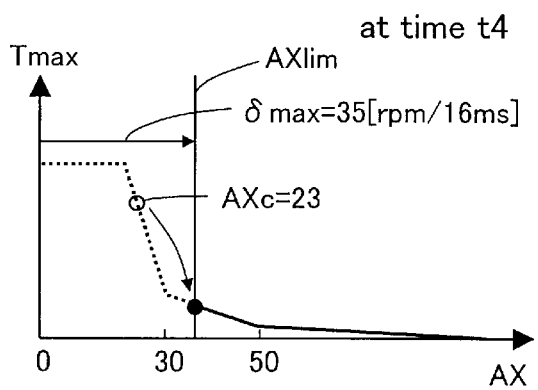
Figure 10C:
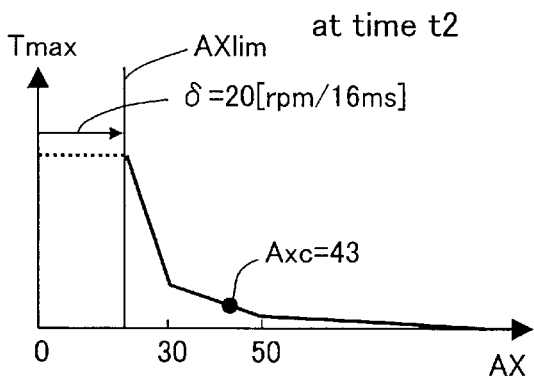
Figure 11A:
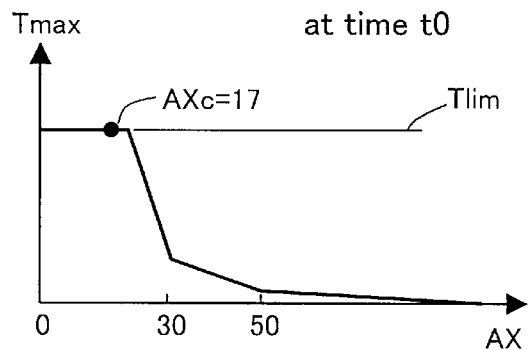
FIGS. 11(A)–11(E) show a second modification of the procedure for enhancing torque restrictions in accordance with the first embodiment.
Figure 11D:
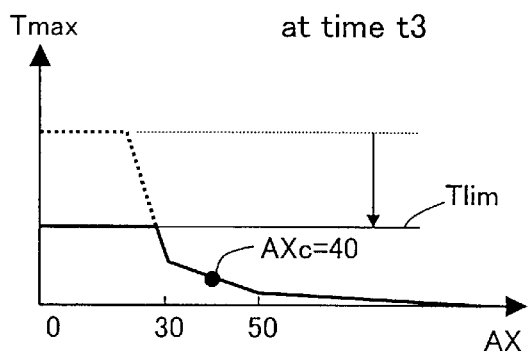
Figure 11B:
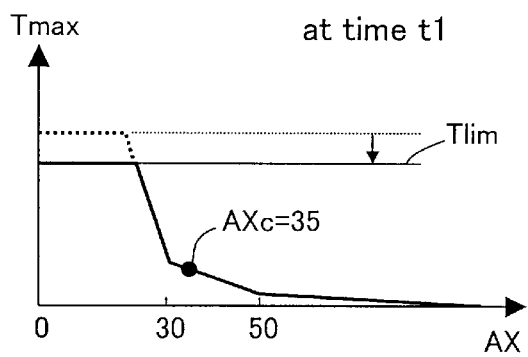
Figure 11E:
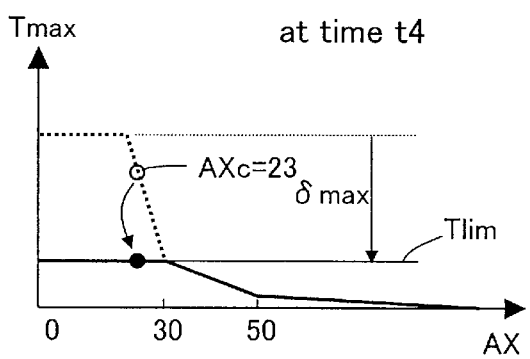
Figure 11C:
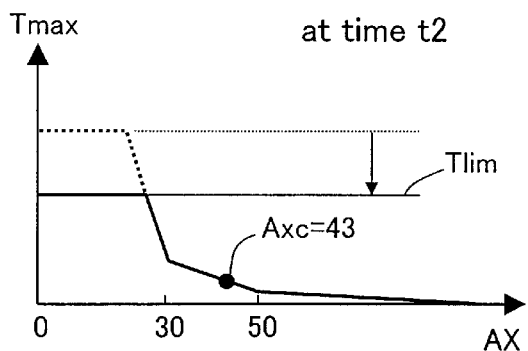

FIGS. 9(a)–9(c) show parameter variations observed when torque restrictions are enhanced in accordance with the first embodiment. This example is similar in the sense that when the driver steps hard on the acceleration pedal in the manner shown in FIG. 9(a), the torque of the second motor MG2 increases abruptly (FIG. 9(c)), slippage occurs, and the second motor MG2 rapidly reaches a higher rpm N (FIG. 9(b)). This is accompanied by a rapid increase in the angular acceleration AX (not shown) of the second motor MG2, so torque restrictions are enhanced, the torque command value of the second motor MG2 is restricted, and the motor torque rapidly decreases (FIG. 9(c)). As a result, slippage is temporarily stopped, and the rpm N decreases. All these steps are substantially the same as those shown in FIGS. 8(a)–8(c). In the first embodiment, however, there was no immediate relaxation of the enhanced torque restrictions, so the torque can increase only to a limited extent after slippage has been stopped and the angular acceleration AX reduced. As a result, slippage is less likely to recur.

FIGS. 10(A)–10(E) show a first modification of the procedure for enhancing torque restrictions in accordance with the first embodiment. In the first modification, the minimum angular acceleration AXlim is gradually varied instead of the torque axis being moved. As used herein, the term "minimum angular acceleration AXlim" refers to a minimum value of an angular acceleration AX on a torque restriction map. FIGS. 10(A) to 10(E) show the manner in which the minimum angular acceleration AXlim gradually increases when the torque restrictions are enhanced. As can be seen in FIGS. 10(A) to 10(D), the motor torque is limited by a torque value expressed as the current angular acceleration AXc on a torque restriction map when the current angular acceleration AXc is greater than the minimum angular acceleration AXlim. As can also be seen in FIG. 10(E), the motor torque is limited by a torque value (shown by a black circle) expressed as the minimum angular acceleration AXlim on a torque restriction map when the current angular acceleration AXc is less than the minimum angular acceleration AXlim. A maximum shift δmax can be set for the minimum angular acceleration AXlim as well (FIG. 10(E)). The minimum angular acceleration AXlim gradually decreases when the torque restrictions are relaxed.

It is thus possible to reduce the likelihood of repeated slippage in the same manner as in the first embodiment by gradually varying the minimum angular acceleration AXlim of a torque restriction map in order to enhance or relax torque restrictions.

FIGS. 11(A)–11(E) show a second modification of the procedure for enhancing torque restrictions in accordance with the first embodiment. In the second modification, the maximum torque upper limit Tlim of a torque restriction map is gradually varied instead of the minimum angular acceleration AXlim being varied in accordance with the first modification. As used herein, the term "maximum torque upper limit Tlim" refers to the maximum value of an upper torque limit Tmax on a torque restriction map. When the maximum torque upper limit Tlim is gradually varied, the shape of the torque restriction map varies as shown in FIGS. 11(A) to 11(E). The motor torque is limited by a torque value (shown by a black circle) expressed as the current angular acceleration AXc on a post-enhancement torque restriction map. A maximum shift δmax can be set for the maximum torque upper limit Tlim as well. The maximum torque upper limit Tlim gradually increases when the torque restrictions are relaxed.

It is thus possible to reduce the likelihood of repeated slippage in the same manner as in the first embodiment or the first modification by gradually varying the maximum torque upper limit Tlim of a torque restriction map in order to enhance or relax torque restrictions.

Slippage can thus be stopped with high efficiency because the torque restrictions on the second motor MG2 are gradually enhanced in the period during which the angular acceleration AX of the second motor MG2 is greater than the first threshold value AXT1 in the first embodiment and its modifications. In addition, slip recurrence can be efficiently prevented because the torque restrictions are gradually relaxed if the angular acceleration AX subsequently decreases below a threshold value AXT1 and a restriction relaxation condition other than the threshold value AXT1 is satisfied. As a result, it is possible to reduce the likelihood of repeated slippage.

In particular, the axle 112 and the output shaft of the second motor MG2 rotate at a constant ratio when the rpm values of the left and right wheels on the axle 112 (FIG. 1) are substantially equal to each other, making it possible to achieve a more efficient slip control by controlling the second motor MG2.

E. Second Embodiment of Slip Control

In the second embodiment, an even more efficient slip control is achieved by supplementing the above-described control procedure of the first embodiment with a procedure in which restrictions are applied to the rpm N of the second motor MG2.

Figure 12A:
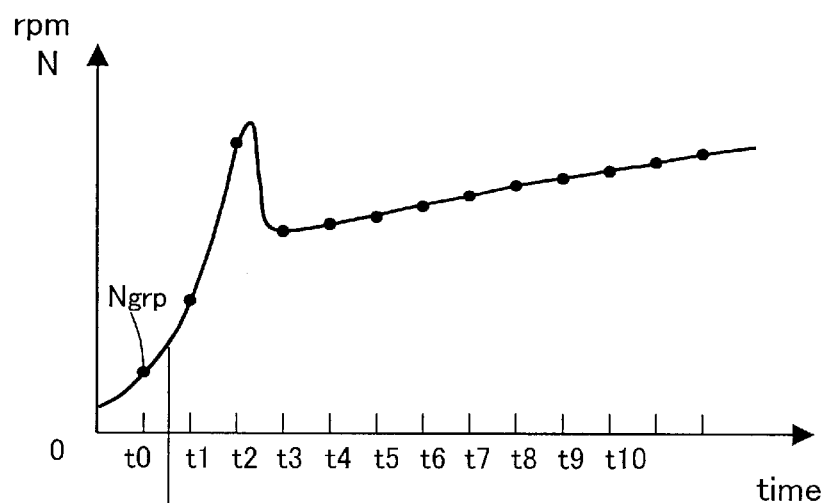
FIGS. 12(A) and 12(B) are graphs depicting variations in the angular acceleration AX and rpm N of the second motor MG2.
Figure 12B:
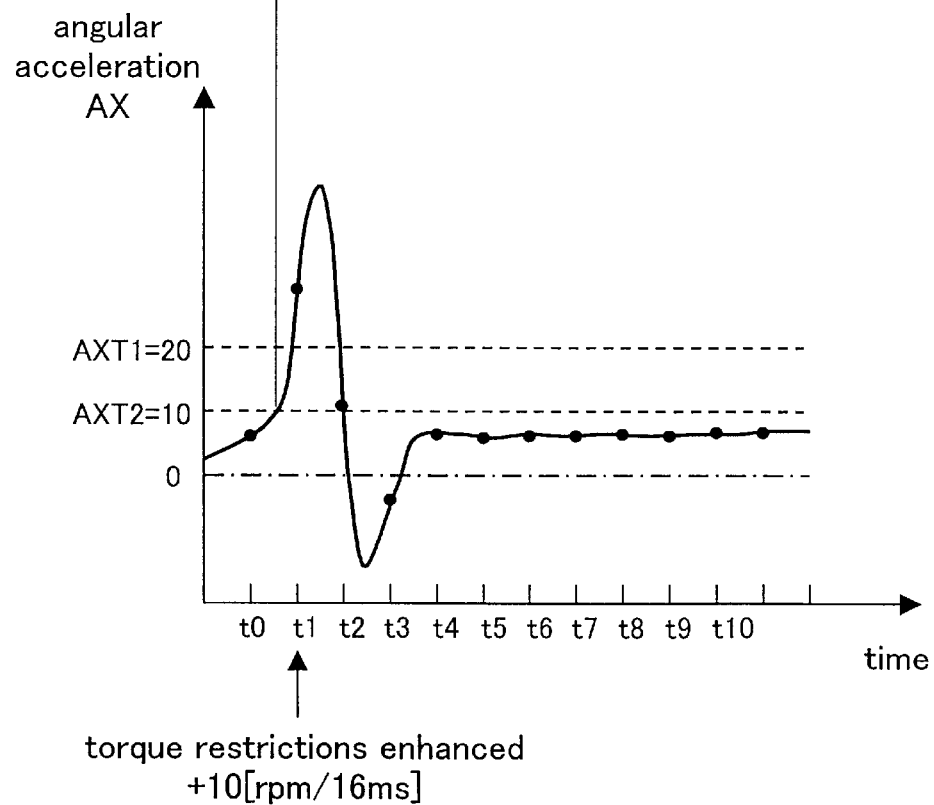

FIGS. 12(A) and 12(B) are graphs depicting variations in the angular acceleration AX and rpm N of the second motor MG2. At time t1, the angular acceleration AX is greater than the first threshold value AXT1, so the torque restrictions are enhanced in the manner described in the first embodiment, and a torque restriction map such as that shown in FIG. 7(B) is established, as can be seen in FIG. 12(B). As a result, the torque of the second motor MG2 is restricted, the rpm N is immediately reduced, and the angular acceleration AX is brought below the first threshold value AXT1. However, the torque restriction map subsequently retains the state shown in FIG. 7(B) because the above-described relaxation conditions (M1a) to (M1c) fail to hold up during the standby period Δt (FIG. 6). Following time t3 in FIG. 12(B), the torque restrictions may become insufficient due to tire wear, road conditions, and other factors despite the restrictions imposed on the motor torque. It is therefore possible to encounter situations in which slippage continues and the motor rpm N gradually increases following time t3, as shown in FIG. 12(A).

Thus, the second embodiment entails performing a routine in which slippage is first detected using the below-described slip sensing condition S2, and torque is controlled using the upper limit of motor rpm in order to prevent situations in which slippage persists and the motor rpm N continues to increase.

(S2): The angular acceleration AX is greater than a second threshold value AXT2, and the motor rpm N is greater than a road-gripping rpm Ngrp plus 40 rpm (Ngrp+40).

As used herein, the term "road-gripping rpm Ngrp" refers to the rpm value at time t0 immediately before the angular acceleration AX exceeds the second threshold value AXT2 (10 [rpm/16 ms]), as shown in FIGS. 12(A) and 12(B). The term "road-gripping rpm" refers to the rpm achieved by a wheel having good traction on a road surface prior to slippage. A value existing at another moment may also be adopted as the road-gripping rpm Ngrp. In common practice, it is possible to define the road-gripping rpm Ngrp to be a rpm value at any specific moment during a period in which the angular acceleration AX goes over the second threshold value AXT2.

If the aforementioned slip sensing condition S2 is satisfied, slippage develops and the motor rpm N gradually increases beyond the value Ngrp existing immediately before the slippage. In view of this, the torque is controlled using the upper limit of the motor rpm N.

Figure 13A:
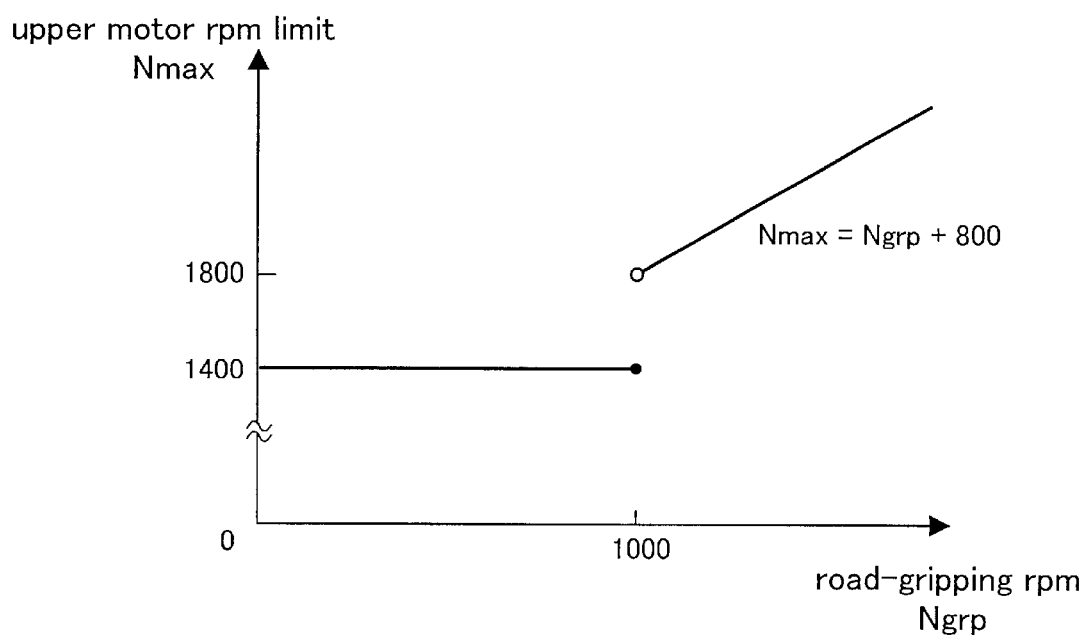
FIGS. 13(A) and 13(B) show the upper limit of the motor rpm setting adopted in the second embodiment, and the torque restrictions associated therewith.
Figure 13B:
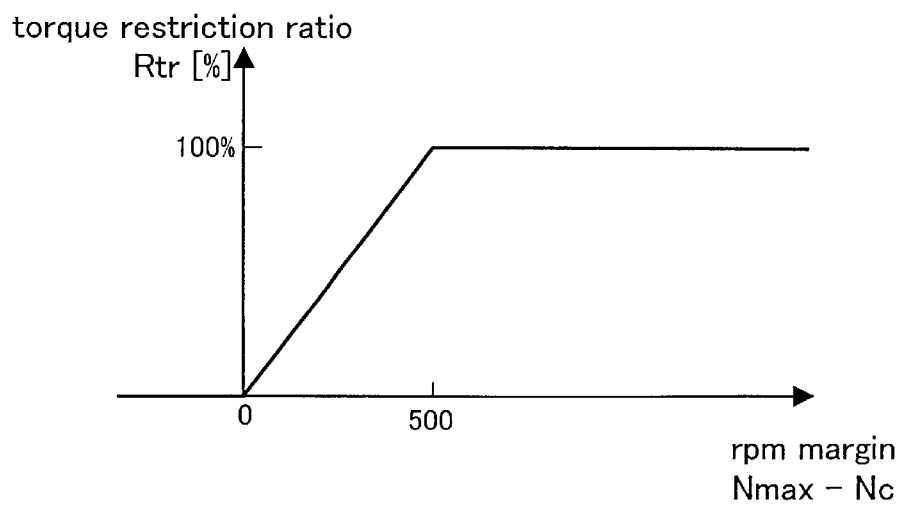

FIGS. 13(A) and 13(B) show the upper limit of the motor rpm setting adopted for the second embodiment, and the torque restrictions associated therewith. As can be seen in FIG. 13(A), the upper rpm limit Nmax of the second motor MG2 is established in the following manner in accordance with the road-gripping rpm Ngrp.

(1) Nmax=1400 rpm when Ngrp is 1000 rpm or less (2) Nmax=Ngrp+800 rpm when Ngrp is greater than 1000 rpm The upper rpm limit Nmax is established with consideration for preventing excessive rotation of the differential gear 114 (FIG. 1). Specifically, the differential gear 114 is likely to rotate excessively when there is a large difference in rpm between left and right wheels. By contrast, the rpm of the differential gear 114 can be brought within a certain rpm range by selecting the upper limits Nmax described in (1) and (2) above for the rpm N of the second motor MG2 even when there is a large difference in rpm between left and right wheels. As a result, the differential gear 114 can be prevented from excessive rotation.

Torque is controlled using the torque restriction ratio Rtr shown in FIG. 13(B). In this example, the torque restriction ratio Rtr is set in accordance with the rpm margin (Nmax−Nc), which is the difference between the upper motor rpm limit Nmax and the current rpm Nc. The torque restriction ratio Rtr referred to herein is a multiplier for the upper limit Tmax of the torque restriction map, so the actual upper torque limit is given by (Tmax×Rtr). Specifically, a value (Tmax×Rtr) obtained by multiplying the upper limit Tmax of a torque restriction map (such as that shown in FIGS. 6 and 7(A)–7(E)) by the ratio Rtr thereof is used as the actual upper torque limit of the second motor MG2.

When the rpm margin is 500 rpm or greater, the restriction ratio Rtr is 100%, and the upper limit Tmax shown in FIG. 6 or 7(A)–7(E) can be used directly as the upper torque limit. By contrast, the restriction ratio Rtr is proportional to the rpm margin when the latter is less than 500 rpm, so the actual upper torque limit (Tmax×Rtr) is also adjusted according to the margin. Consequently, the actual upper torque limit is reduced to a low value when the current rpm Nc of the second motor MG2 is close to the upper limit Nmax thereof. As a result, the second motor MG2 is controlled to prevent the current rpm Nc from exceeding the upper limit Nmax. The actual upper torque limit Tmax×Rtr becomes zero when the current rpm Nc exceeds the upper limit Nmax thereof (that is, when the rpm margin is negative), making it possible to prevent the rpm N from increasing.

Torque restrictions on motor rpm are canceled when all the following canceling conditions (M2a) to (M2c) are satisfied.

(M2a): Current rpm Nc is equal to or less than a value (Ngrp+40) obtained by adding 40 rpm to the road-gripping rpm Ngrp.

(M2b): The absolute value of angular acceleration AX is less than 5 [rpm/16 ms].

(M2c): The difference in rpm between front and rear wheels is no more than a prescribed allowed value.

If the canceling conditions M2a to M2c are satisfied for a prescribed period (for example, 500 ms), it is concluded that slippage has been stopped, and the torque restrictions based on motor rpm restrictions are canceled.

In the second embodiment, the torque of the second motor MG2 is controlled such that restrictions are imposed on the motor rpm, making it possible to prevent situations in which persistent slippage occurs and there is an excessive increase in the rpm of the second motor MG2 or the rpm of the differential gear 114.

Imposing torque restrictions based on motor rpm restrictions described above is particularly effective when the torque restrictions cannot be enhanced in the manner described with reference to FIGS. 7(A)–7(E). Consequently, the second threshold value AXT2 used in the second embodiment should preferably be set below the first threshold value AXT1 used in the first embodiment.

F. Third Embodiment of Slip Control

In the third embodiment, the motor torque control of the second embodiment is supplemented with suppressing excessive drive shaft rotation by operating the engine 150 in an idling state under specific conditions.

Figure 14:
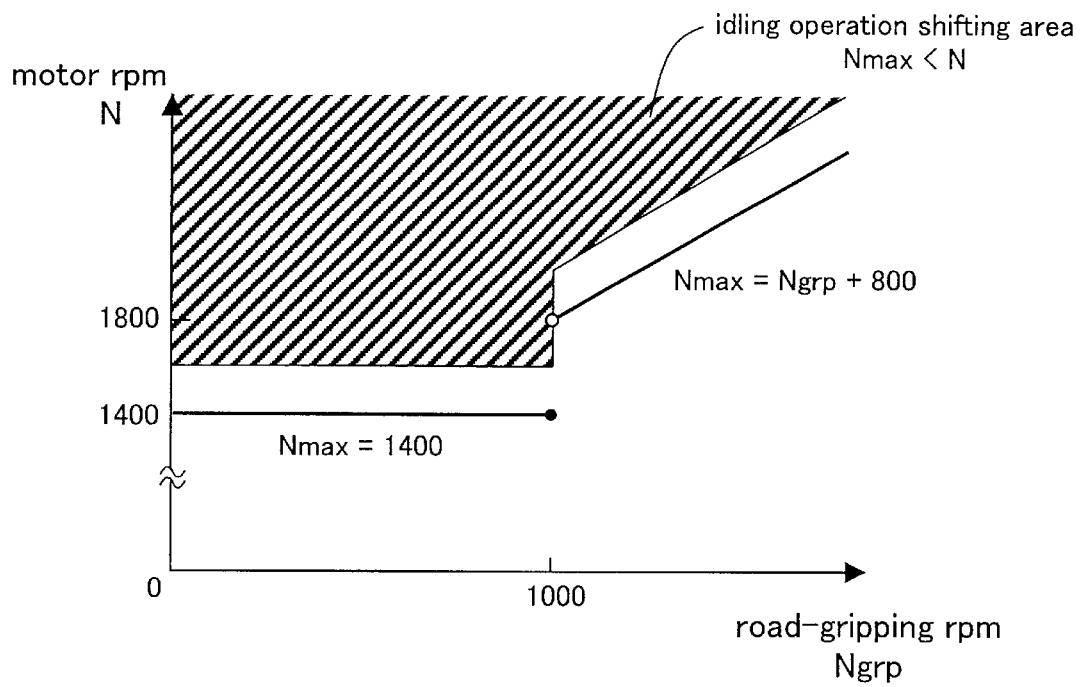
FIG. 14 is a diagram illustrating the size of the idling operation shifting area adopted in the third embodiment.

FIG. 14 is a diagram illustrating an idling operation shifting area adopted in the third embodiment. As used herein, the term "idling operation shifting area" refers to an area in which the engine 150 is forcibly shifted into an idling state. The master control CPU 272 brings the engine 150 into an idling state when the following condition (S3) is satisfied.

(S3): The current motor rpm Nc exceeds a value (Nmax+200) obtained by adding 200 rpm to the upper limit Nmax.

When the condition S3 is satisfied, the torque from the engine 150 drives the axle 112 even with zero motor torque, allowing the motor rpm to remain unreduced and slippage to continue. In view of this, the engine 150 is forced to operate in an idling state under such conditions so that the motor rpm is reduced and the slippage stopped. As used herein, the phrase "being forced to operate in an idling state" refers to an operation in which an idling state is maintained even when the accelerator opening is more than zero.

The forced idling operation is canceled if at least one of the following canceling conditions (M3a) and (M3b) is satisfied.

(M3a): The current rpm Nc of the motor MG2 is less than a value (Ngrp−500) obtained by subtracting 500 rpm from the road-gripping rpm Ngrp.

(M3b): The angular acceleration AX is zero or less.

It can be concluded that slippage has stopped if either of the canceling conditions (M3a) and (M3b) is satisfied. Consequently, performance should preferably be enhanced in this case by allowing the engine 150 to increase its output.

There are also cases in which the engine 150 should preferably be forcibly brought into an idling state when slippage occurs during the backing of a vehicle. In the hybrid vehicle of the present embodiment, the driving force for backing is primarily obtained by the powering of the second motor MG2, and almost all the mechanical power of the engine 150 is regenerated by the first motor MG1. Any slippage occurring during backing renders the rpm N of the second motor MG2 unstable, with the result that the electrical power regenerated by the first motor MG1 is also rendered unstable in some cases. Because the engine 150 is controlled such that the amount of electrical power regenerated in the process is kept constant, the operating state of the engine 150 eventually experiences hunting.

In view of this, the master control CPU 272 concludes that slippage has occurred and forces the engine 150 into an idling state when the angular acceleration AX of the second motor MG2 exceeds 20 [rpm/16 ms] during backing. This allows slippage to be stopped and prevents the engine 150 from experiencing hunting.

The forcible idling operation of the engine during backing may, for example, be canceled when the vehicle stops. The forcible idling operation can also be canceled when specific canceling conditions (slip stoppage conditions) are satisfied.

Thus, the third embodiment makes it possible to prevent the drive shaft from rotating excessively, the engine 150 from experiencing hunting, or other undesirable phenomena from occurring by forcibly operating the engine in an idling state when specific slip sensing conditions are satisfied.

G. Fourth Embodiment of Slip Control

Whereas the above-described first to third embodiments entailed performing slip-stopping control (so-called traction control), there are also situations in which slippage cannot be stopped. For example, a certain amount of slip must be allowed when the aim is to escape from a pothole in a snow-covered road, muddy road, or other type of poorly maintained road. In view of this, the fourth embodiment entails performing the slip control described in the first embodiment such that slippage is allowed to occur when certain slip permitting conditions are satisfied.

Figure 15:
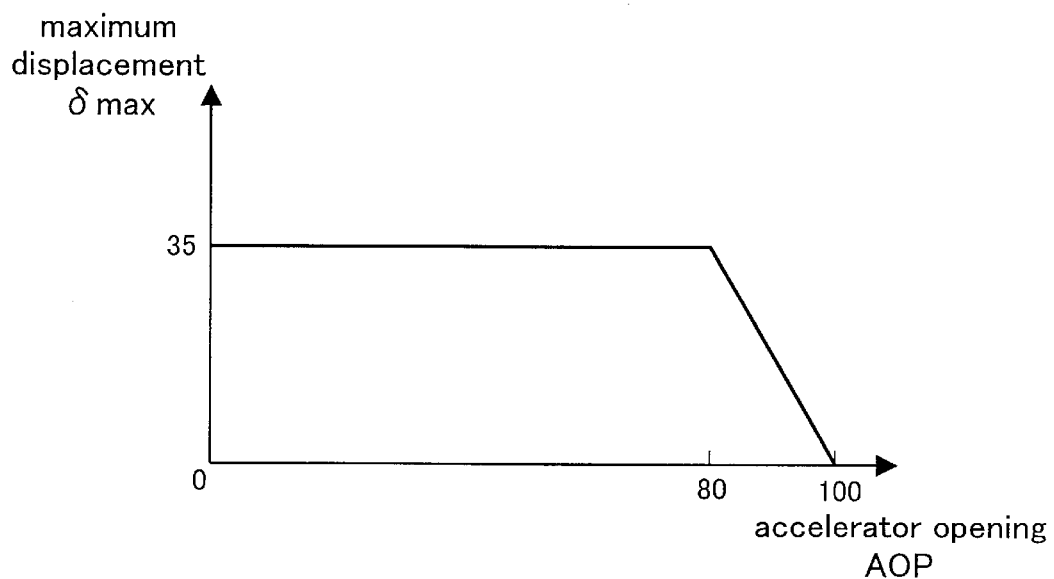
FIG. 15 is a graph depicting the relation between the accelerator opening and the maximum displacement δmax of a torque axis adopted in the fourth embodiment.

FIG. 15 is a graph depicting the relation between the accelerator opening and the maximum displacement δmax of a torque axis when torque restrictions are enhanced. The maximum displacement δmax of the torque axis referred to herein is the value used during the enhancement of torque restrictions described with reference to FIGS. 7(A) to 7(E). As can be seen in FIG. 15, the maximum displacement δmax of the torque axis is kept at its initial level (35 [rpm/16 ms]) when the accelerator opening AOP is between 0% (completely closed) and 80%. Consequently, the slip control routine described in the first embodiment is executed if the driver has stepped only lightly on the acceleration pedal. The reason for this is that any slip is regarded as unintentional if the driver has stepped only lightly on the acceleration pedal.

When, however, the accelerator opening AOP is between 80% and 100% (completely open), the maximum displacement δmax of the torque axis linearly decreases to zero from the initial value (35 [rpm/16 ms]) with an increase in the accelerator opening AOP. The torque axis remains substantially stationary and the initial state shown in FIG. 5 is preserved when the driver steps on the acceleration pedal in this manner in an attempt to escape from a pothole in a poorly maintained road. Some torque is therefore outputted by the second motor MG2 even when the wheels slip and the angular acceleration AX of the second motor MG2 rises to a fairly high level. As a result, certain slip is permitted and the vehicle can escape from the pothole in the poorly maintained road.

The graph in FIG. 15 is one possible example of an arrangement in which the degree of torque control is adjusted in accordance with the accelerator opening AOP when the accelerator opening AOP falls within a prescribed range in the vicinity of 100%.

FIGS. 16(a)–16(e) show the manner in which parameters vary when an attempt is made to escape from a pothole in a poorly maintained road by adopting the entire set of slip control procedures described with reference to first to fourth embodiments. When the driver steps on the acceleration pedal such that the accelerator opening AOP reaches substantially 100% in the manner shown in FIG. 16(a), the second motor MG2 increases its torque (FIG. 16(c)) and rpm N (FIG. 16(d)). When, however, the accelerator opening AOP is substantially 100%, the maximum displacement δmax of the torque axis is set to zero (FIG. 16(e)) in the manner described with reference to FIG. 15, and the torque restriction map remains in the state shown in FIG. 5. Using the torque restriction map of FIG. 5 restricts the torque of the second motor MG2 when the angular acceleration AX is high, and motor torque is therefore reduced. The motor torque is further restricted by the upper limit of the motor rpm N, as described with reference to FIGS. 13(A) and 13(B). As a result, keeping the actual torque of the second motor MG2 at a relatively low level allows the driver to create intentional slip while preventing the motor rpm N from reaching an excessively high level. Although this is not shown by the example of FIGS. 16(a)–16(e), the engine 150 is operated in an idling state when the rpm N of the second motor MG2 falls within the idling operation shifting area described with reference to FIG. 14.

Thus, the fourth embodiment allows torque restrictions to be relaxed irrespective of other conditions when the driver steps on the acceleration pedal, permitting some slippage to occur and making it possible to escape from a pothole in a poorly maintained road.

The same control routine, which is executed when the accelerator opening AOP reaches 100% in FIG. 15 in the above fourth embodiment, can be performed as a result of the fact that the driver operates a specific torque control off-switch instead of relaxing torque restrictions in accordance with the accelerator opening AOP.

H. Modifications

H1. Modification 1

Although the above embodiments were described with reference to a so-called mechanical-distribution hybrid vehicle in which a planetary gear is used to distribute the mechanical power of the engine between the axle and the first motor MG1, the present invention is also applicable to so-called electrical-distribution hybrid vehicles in which the planetary gear is dispensed with and the engine power is electrically distributed using a motor/generator. An electrical-distribution hybrid motor vehicle is disclosed in U.S. Pat. No. 5,804,934, the disclosure of which is hereby incorporated by reference for all purposes.

The present invention can be adapted to vehicles other than hybrid vehicles. In other words, the present invention can be adapted to any vehicle in which at least one wheel-driving prime mover is used. It should be noted, however, that vehicles in which the output shaft of the motor is coupled with the drive shaft of the vehicle (such as the hybrid vehicles described in the above embodiments) allow fast response to be obtained for the torque control of the motor-based drive shaft, making it possible to control slippage with higher efficiency.

H2. Modification 2

Although the above embodiments were described with reference to cases in which torque restrictions are gradually enhanced and relaxed at regular intervals, it is also possible to adopt an arrangement in which the torque restrictions are enhanced or relaxed as a single operation. It should be noted, however, that enhancing or relaxing torque restrictions in a gradual manner is beneficial in the sense that slip recurrence can be prevented with higher efficiency.

H3. Modification 3

The parametric values used in the above embodiments are merely explanatory and may lie outside the cited ranges.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A slip control device for use in a vehicle including at least one prime mover for driving a drive shaft of the vehicle, the drive shaft transmitting a driving force of the prime mover to wheels of the vehicle, the slip control device comprising:

an angular acceleration meter configured to measure an angular acceleration of the drive shaft; and a torque controller configured to enhance torque restrictions of the drive shaft when the angular acceleration exceeds a specific first threshold value, and to relax the enhanced torque restrictions once the angular acceleration falls below the first threshold value and further satisfies a specific restriction relaxation condition.

2. A slip control device as defined in claim 1, wherein the torque restrictions are expressed as a graph representing a relation between the angular acceleration and an upper torque limit of the drive shaft in a two dimensional space defined by an angular acceleration axis and a torque axis where the upper torque limit of the drive shaft decreases with increased angular acceleration; and the torque restrictions are enhanced by moving a position of the torque axis relative to the graph along the angular acceleration axis while preserving a shape of the graph.

3. A slip control device as defined in claim 2, wherein the movement of the torque axis during the enhancement of the torque restrictions is gradually effected in a period during which the angular acceleration is greater than the first threshold value.

4. A slip control device as defined in claim 2, wherein the torque restrictions are relaxed by moving the position of the torque axis relative to the graph along the angular acceleration axis while preserving a shape of the graph.

5. A slip control device as defined in claim 4, wherein the movement of the torque axis during the relaxation of the torque restrictions is gradually effected in a period during which the specific restriction relaxation condition is satisfied.

6. A slip control device as defined in claim 1, wherein
the torque restrictions are expressed as a graph representing a relation between the angular acceleration and an upper torque limit of the drive shaft in a two dimensional space defined by an angular acceleration axis and a torque axis where the upper torque limit of the drive shaft decreases with increased angular acceleration; and
the torque restrictions are enhanced and relaxed by varying a minimum value available for the angular acceleration in the graph.

7. A slip control device as defined in claim 1, wherein
the torque restrictions are expressed as a graph representing a relation between the angular acceleration and an upper torque limit of the drive shaft in a two dimensional space defined by an angular acceleration axis and a torque axis where the upper torque limit of the drive shaft decreases with increased angular acceleration; and
the torque restrictions are enhanced and relaxed by varying a maximum value available for the upper torque limit in the graph.

8. A slip control device as defined in claim 1, wherein
the angular acceleration meter includes a revolution meter for measuring a revolution of the drive shaft; and
the torque controller sets an upper limit for the revolution of the drive shaft when the angular acceleration has exceeded a specific second threshold value, and controls the torque of the drive shaft to prevent the revolution of the drive shaft from exceeding the upper limit.

9. A slip control device as defined in claim 8, wherein the upper limit of the revolution of the drive shaft is set in accordance with a value of the revolution of the drive shaft at a specific moment during a period in which the angular acceleration goes over the second threshold value.

10. A slip control device as defined in claim 8, wherein
the at least one prime mover includes a motor and an internal combustion engine to drive the wheels;
the vehicle further comprises a power-splitting mechanism for transmitting the driving force of the motor and internal combustion engine to the drive shaft; and
the torque controller controls a torque of the motor to try to prevent the revolution of the drive shaft from exceeding the upper limit, and forces the internal combustion engine to operate in an idling state when the revolution of the drive shaft has exceeded the upper limit at least by a specific minimum amount in spite of the motor torque control.

11. A slip control device as defined in claim 1, wherein the torque controller relaxes the torque restrictions irrespective of other conditions when an accelerator position level for the vehicle is substantially 100%.

12. A slip control device as defined in claim 11, wherein the torque controller adjusts a degree of torque control in accordance with the accelerator position level for the vehicle when the accelerator position level falls within a specific range in the vicinity of 100%.

13. A slip control device as defined in claim 1, wherein the torque controller relaxes the torque restrictions irrespective of other conditions when a specific torque control off-switch has been actuated.

14. A vehicle comprising:
wheels for moving the vehicle;
at least one prime mover;
a drive shaft for transmitting a driving force of the prime mover to the wheels; and
a slip control device, the slip control device comprising:
an angular acceleration meter configured to measure an angular acceleration of the drive shaft; and
a torque controller configured to enhance torque restrictions of the drive shaft when the angular acceleration exceeds a specific first threshold value, and to relax the enhanced torque restrictions once the angular acceleration falls below the first threshold value and further satisfies a specific restriction relaxation condition.

15. A vehicle as defined in claim 14, wherein
the torque restrictions are expressed as a graph representing a relation between the angular acceleration and an upper torque limit of the drive shaft in a two dimensional space defined by an angular acceleration axis and a torque axis where the upper torque limit of the drive shaft decreases with increased angular acceleration; and
the torque restrictions are enhanced by moving a position of the torque axis relative to the graph along the angular acceleration axis while preserving a shape of the graph.

16. A vehicle as defined in claim 15, wherein the movement of the torque axis during the enhancement of the torque restrictions is gradually effected in a period during which the angular acceleration is greater than the first threshold value.

17. A vehicle as defined in claim 15, wherein the torque restrictions are relaxed by moving the position of the torque axis relative to the graph along the angular acceleration axis while preserving a shape of the graph.

18. A vehicle as defined in claim 17, wherein the movement of the torque axis during the relaxation of the torque restrictions is gradually effected in a period during which the specific restriction relaxation condition is satisfied.

19. A vehicle as defined in claim 14, wherein
the torque restrictions are expressed as a graph representing a relation between the angular acceleration and an upper torque limit of the drive shaft in a two dimensional space defined by an angular acceleration axis and a torque axis where the upper torque limit of the drive shaft decreases with increased angular acceleration; and
the torque restrictions are enhanced and relaxed by varying a minimum value available for the angular acceleration in the graph.

20. A vehicle as defined in claim 14, wherein
the torque restrictions are expressed as a graph representing a relation between the angular acceleration and an upper torque limit of the drive shaft in a two dimensional space defined by an angular acceleration axis and a torque axis where the upper torque limit of the drive shaft decreases with increased angular acceleration; and
the torque restrictions are enhanced and relaxed by varying a maximum value available for the upper torque limit in the graph.

21. A vehicle as defined in claim 14, wherein
the angular acceleration meter includes a revolution meter for measuring a revolution of the drive shaft; and
the torque controller sets an upper limit for the revolution of the drive shaft when the angular acceleration has exceeded a specific second threshold value, and controls the torque of the drive shaft to prevent the revolution of the drive shaft from exceeding the upper limit.

22. A vehicle as defined in claim 21, wherein the upper limit of the revolution of the drive shaft is set in accordance with a value of the revolution of the drive shaft at a specific moment during a period in which the angular acceleration goes over the second threshold value.

23. A vehicle as defined in claim 21, wherein
the at least one prime mover includes a motor and an internal combustion engine to drive the wheels;
the vehicle further comprises a power-splitting mechanism for transmitting the driving force of the motor and internal combustion engine to the drive shaft; and
the torque controller controls a torque of the motor to try to prevent the revolution of the drive shaft from exceeding the upper limit, and forces the internal combustion engine to operate in an idling state when the revolution of the drive shaft has exceeded the upper limit at least by a specific minimum amount in spite of the motor torque control.

24. A vehicle as defined in claim 14, wherein the torque controller relaxes the torque restrictions irrespective of other conditions when an accelerator position level for the vehicle is substantially 100%.

25. A vehicle as defined in claim 24, wherein the torque controller adjusts a degree of torque control in accordance with the accelerator position level for the vehicle when the accelerator position level falls within a specific range in the vicinity of 100%.

26. A vehicle as defined in claim 14, wherein the torque controller relaxes the torque restrictions irrespective of other conditions when a specific torque control off-switch has been actuated.

27. A slip control method for a vehicle including at least one prime mover for driving a drive shaft of the vehicle, the drive shaft transmitting a driving force of the prime mover to wheels of the vehicle, the method comprising the steps of:
(a) measuring an angular acceleration of the drive shaft; and
(b) enhancing torque restrictions of the drive shaft when the angular acceleration exceeds a specific first threshold value, and to relax the enhanced torque restrictions once the angular acceleration falls below the first threshold value and further satisfies a specific restriction relaxation condition.

28. A slip control method as defined in claim 27, wherein
the torque restrictions are expressed as a graph representing a relation between the angular acceleration and an upper torque limit of the drive shaft in a two dimensional space defined by an angular acceleration axis and a torque axis where the upper torque limit of the drive shaft decreases with increased angular acceleration; and
the torque restrictions are enhanced by moving a position of the torque axis relative to the graph along the angular acceleration axis while preserving a shape of the graph.

29. A slip control method as defined in claim 28, wherein the movement of the torque axis during the enhancement of the torque restrictions is gradually effected in a period during which the angular acceleration is greater than the first threshold value.

30. A slip control method as defined in claim 28, wherein the torque restrictions are relaxed by moving the position of the torque axis relative to the graph along the angular acceleration axis while preserving a shape of the graph.

31. A slip control method as defined in claim 30, wherein the movement of the torque axis during the relaxation of the torque restrictions is gradually effected in a period during which the specific restriction relaxation condition is satisfied.

32. A slip control method as defined in claim 27, wherein
the torque restrictions are expressed as a graph representing a relation between the angular acceleration and an upper torque limit of the drive shaft in a two dimensional space defined by an angular acceleration axis and a torque axis where the upper torque limit of the drive shaft decreases with increased angular acceleration; and
the torque restrictions are enhanced and relaxed by varying a minimum value available for the angular acceleration in the graph.

33. A slip control method as defined in claim 27, wherein
the torque restrictions are expressed as a graph representing a relation between the angular acceleration and an upper torque limit of the drive shaft in a two dimensional space defined by an angular acceleration axis and a torque axis where the upper torque limit of the drive shaft decreases with increased angular acceleration; and
the torque restrictions are enhanced and relaxed by varying a maximum value available for the upper torque limit in the graph.

34. A slip control method as defined in claim 27, wherein
the step (a) includes a step of measuring a revolution of the drive shaft; and
the step (b) includes the steps of:
setting an upper limit for the revolution of the drive shaft when the angular acceleration has exceeded a specific second threshold value; and
controlling the torque of the drive shaft to prevent the revolution of the drive shaft from exceeding the upper limit.

35. A slip control method as defined in claim 34, wherein the upper limit of the revolution of the drive shaft is set in accordance with a value of the revolution of the drive shaft at a specific moment during a period in which the angular acceleration goes over the second threshold value.

36. A slip control method as defined in claim 34, wherein the at least one prime mover includes a motor and an internal combustion engine to drive the wheels, and the vehicle further comprises a power-splitting mechanism for transmitting the driving force of the motor and internal combustion engine to the drive shaft; and
the step (b) further includes the steps of:
controlling a torque of the motor to try to prevent the revolution of the drive shaft from exceeding the upper limit; and
forcing the internal combustion engine to operate in an idling state when the revolution of the drive shaft has exceeded the upper limit at least by a specific minimum amount in spite of the motor torque control.

37. A slip control method as defined in claim 27, wherein the step (b) includes a step of relaxing the torque restrictions irrespective of other conditions when an accelerator position level for the vehicle is substantially 100%.

38. A slip control method as defined in claim 37, wherein the step (b) further includes a step of adjusting a degree of torque control in accordance with the accelerator position level for the vehicle when the accelerator position level falls within a specific range in the vicinity of 100%.

39. A slip control method as defined in claim 27, wherein the step (b) includes a step of relaxing the torque restrictions irrespective of other conditions when a specific torque control off-switch has been actuated.

* * * * *